Figure 1:
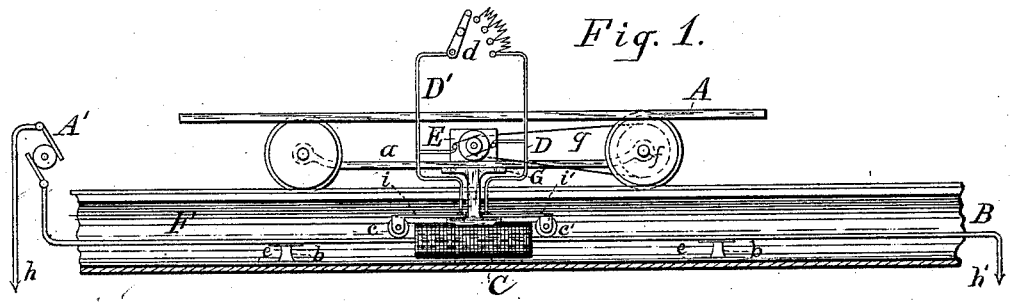

(No Model.)

M. W. DEWEY.
ELECTRIC RAILWAY.

No. 419,841. Patented Jan. 21, 1890.

WITNESSES:
J. J. Laass
C. L. Bendixon

INVENTOR:
Mark W. Dewey
BY
Duell, Laass & Duell
his ATTORNEYS

UNITED STATES PATENT OFFICE.

MARK W. DEWEY, OF SYRACUSE, NEW YORK, ASSIGNOR TO THE DEWEY CORPORATION, OF SAME PLACE.

ELECTRIC RAILWAY.

SPECIFICATION forming part of Letters Patent No. 419,841, dated January 21, 1890.

Application filed November 2, 1889. Serial No. 329,003. (No model.)

*To all whom it may concern:*

Be it known that I, MARK W. DEWEY, of Syracuse, in the county of Onondaga, in the State of New York, have invented new and useful Improvements in Electric Railways, of which the following, taken in connection with the accompanying drawings, is a full, clear, and exact description.

My invention relates to electric railways wherein the motors are connected to a line-working conductor arranged along the path of the vehicle in series or derived circuit.

In the series electric railways that have been proposed the supply or line working conductor or conductors were constructed in sections with circuit makers and breakers between the sections. These circuit makers and breakers were maintained in a closed condition until the approach of the car, which, by means of various devices, operated the circuit-breakers, and thereby compelled the current in the supply conductor or conductors to flow through the shunt-path in connection with the said conductor and leading through the propelling-motor on the vehicle. Such a system is both very expensive and difficult to operate on account of the complicated form of its supply-conductors and their movable nature.

The objects of my invention are to simplify the line-working conductor, to employ but one, to make such conductor plain, stationary, and parallel with the railway, and also permanently continuous—that is, without making and breaking points distributed along in the same, and, further, to direct the current through the motor on the vehicle by creating resistance or counter electro-motive force in the line-conductor between the connections leading to the motor.

To this end my invention consists, broadly, in the combination of a permanently-continuous line-working conductor, a traveling vehicle, an electric motor to propel said vehicle, electrical connections between said motor and working-conductor, and suitable means to create electrical resistance or counter electro-motive force in said conductor between the connections.

My invention consists, further, or more specifically, in the combination of a source of irregular or alternating currents, a permanently-continuous line-working conductor connected thereto, insulated supports of paramagnetic material for said conductor, a traveling vehicle, an electric motor to propel said vehicle, two electrical connections carried by the vehicle and making contact with the working-conductor to supply electricity to the motor, and means carried by the vehicle to create electrical resistance or counter electro-motive force in said conductor between the connections, and consisting of a sheath of laminated paramagnetic material entirely surrounding the line-working conductor, a longitudinal slot through the sheath to permit said supports to pass through, and an iron brush or brushes fixed to the side or sides of the slot and extending transversely across the latter to maintain the same normally closed. Any suitable means or devices may be employed to create electrical resistance or stress in the line-working conductor, or for setting up counter electro-motive force or a tendency thereto.

Figure 2:
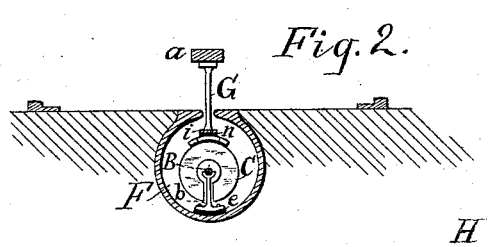
Figure 3:
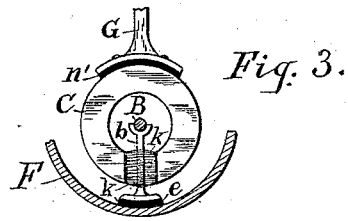
Figure 4:
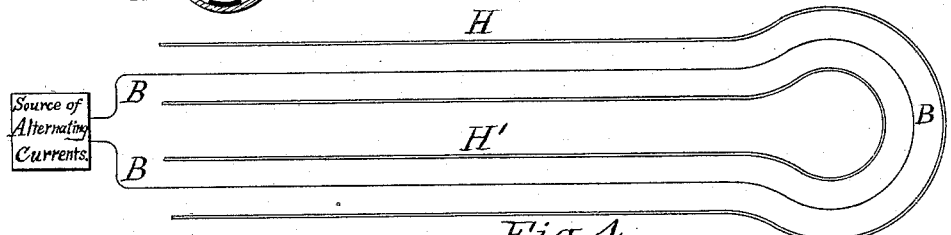
Figure 5:
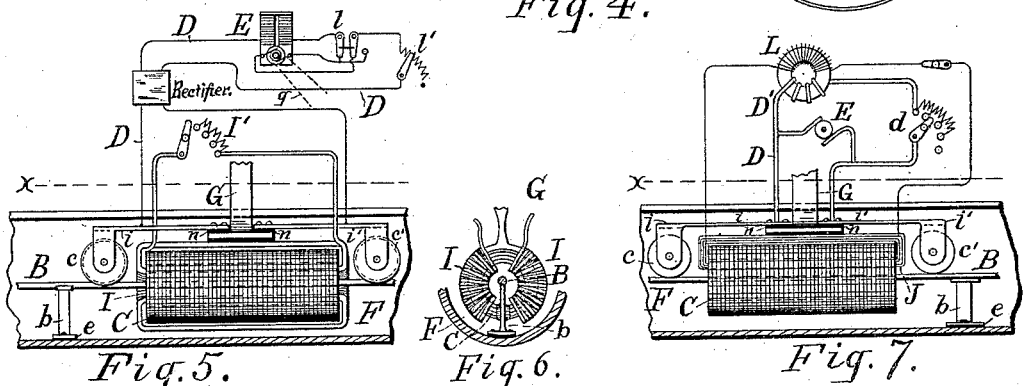
Figure 6:
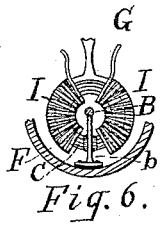
Figure 7:
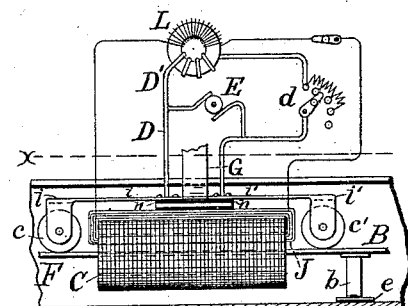
Figure 8:
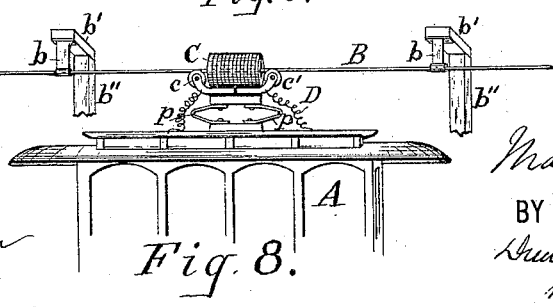

In the accompanying drawings, Figure 1 is a side elevation, partly in section, of an electric railway and motor-car embodying my invention. Fig. 2 is a cross-section of the railway with slotted conduit. Fig. 3 is an end view of the counter electro-motive force device or sheath having a normally-closed yielding longitudinal passage through the same and in a proper position relative to the line-conductor and supports therefor. Fig. 4 represents the preferred path of the line-working conductor when arranged for a double-track road. Fig. 5 illustrates a plan wherein the circuit on the vehicle or car is arranged for the operation of a continuous or direct current motor from an alternating source of electricity and shows a regulating-coil upon the sheath. Fig. 6 is an end view of the sheath with regulating-coil. Fig. 7 shows a plan for inducing an electro-motive force in the coil or coils upon the sheath to assist the iron sheath in opposing the flow of current in the line-conductor through said sheath, and Fig. 8 shows my invention applied to an overhead system.

Referring specifically to the drawings, A in the figures represents the vehicle or car; A', a source of irregular or alternating currents; B, the supply or line-working conductor connected to said source and arranged along the path of the vehicle or railway and supported on supports or standards b.

C is the resisting or counter electro-motive force device in the form of a paramagnetic or iron sheath surrounding the line-conductor and carried by the vehicle, and c and c' are the electrical connections or movable contacts, also carried by the vehicle and disposed one in advance of the other in contact with the conductor B and located one on each side of the sheath C.

D is the vehicle-conductor containing the propelling-motor and having its terminals connected to the contacts c and c'.

Referring now to Figs. 1 and 2, F represents an ordinary slotted underground conduit along the railway and containing the line-conductor B, supported by insulated standards b, located at intervals along the way and extending approximately on the line of the axis of the conduit. The insulation of the standards is indicated at e.

D' is a shunt-circuit around the motor on the vehicle and contains a current-regulator d in the form of an adjustable resistance for the purpose of shunting more or less current from the line-conductor B around the motor E to regulate the latter. The motor E is shown connected to the driving-axle f by a belt or chain g; but said motor and driving-axle may be, of course, connected together in any other suitable manner. The terminals of the line-conductor h and h' may be connected together by the ground or a return metallic conductor.

The electrical connections c and c' are preferably wheels or rollers carried upon the ends of springs i and i', fixed to a support G, depending from the truck-frame a of the vehicle. The springs i and i' permit good yielding contact to be made with the line-conductor, and are insulated from G at n n, but are connected to the terminals of the vehicle-conductor D.

The resisting or counter electro-motive force device or the means to create opposition to the flow of the current in the line-conductor between the contacts c and c' is shown in the drawings in the shape of a paramagnetic or iron sheath C, hereinbefore mentioned. This sheath partly or completely surrounds the line-conductor B or that part of the latter located between the movable contacts c and c', and is preferably of a cylindrical form. The sheath is constructed, preferably, of laminated iron or steel and slotted longitudinally to permit the passage through said sheath of the supports b, and so that it can be easily removed from the conductor when desired. This sheath or cylinder of magnetic or paramagnetic material constitutes a magnetic circuit around the line-conductor B and creates or sets up a strong counter electro-motive force to the currents which attempt to pass through the sheath in rapidly-alternating directions. The effect of such a sheath, practically, is to virtually convert the part of the line-conductor between the contacts c and c' into a non-conductor of alternating currents—a non-conductor which may be moved with and by the vehicle and yet remain substantially stationary. The longitudinal slot or passage through the sheath may be maintained closed and yet allow the supports b to pass through, as shown in Fig. 3, and thus heighten the counter electro-motive-force effect by fixing iron brushes k k to or in the walls of the said slot, so that they will extend transversely across or project into the same and meet each other, and by making the supports b of iron or other paramagnetic metal.

I do not limit myself to the precise form of closed flexible passage through the sheath shown, inasmuch as the same may be effected in various ways and by different means.

Fig. 3 shows insulation n' between the sheath C and support G.

In Fig. 4 two tracks H and H' are shown parallel with each other and leading from the generating-station. From said generating-station, which is equipped with a suitable source of irregular or alternating currents, extend the line-working conductors B along each of the tracks, which are joined at the end remote from the generating-station. It will be obvious that this system is equally adapted for a belt line or when the tracks are not parallel to each other, or, in fact, any form of electric railway now in use.

Although I do not limit myself to sources of alternating currents, better and increased effects can be obtained by employing the same. When alternating currents are used, a direct-current motor may be employed to propel the car by locating a suitable current-rectifier in the vehicle-circuit D, as indicated in Fig. 5. l and l' in the circuit D in the same figure represent current-controlling devices for the direct-current motor E, and g indicates a portion of the belt leading therefrom to the driving-axle. The regulating-coil I upon the sheath C in the same figure and also in Fig. 6 is for regulating the counter electro-motive force of the sheath. The terminals of this coil are connected to an adjustable resistance and circuit maker and breaker I'. When the latter device is open, the counter electro-motive force is at its maximum, and as it is closed and the resistance cut out the said force is weakened, and more current is permitted to flow in the line-conductor through the sheath C, short-circuiting the motor E.

In Fig. 7 the coil J upon the sheath C is for the purpose of assisting the latter in producing a counter electro-motive force in the line-conductor and has induced in it higher-tension currents for this purpose. This increased opposition is effected by means of an inductional transformer L, having its secondary coil connected to the coil J and its primary connected to the springs $i$ and $i'$. The primary coil of the transformer L is located in this case in the shunt D', and a portion of the primary source of current is shunted through said coil, which induces higher-tension currents in the secondary by reason of a difference in the size of the conductors forming the coils and the number of convolutions. The coil J, being connected to the said secondary coil and wound upon the sheath in a proper direction, will develop counter-currents of great strength in the portion of the line-conductor between the contacts $c$ and $c'$, and not only prevent the primary currents from flowing in the line-conductor through the sheath, but will also assist in supplying current to the motor E. The vehicle A has been omitted from Figs. 5 and 7 for convenience; but it will be understood, of course, that the apparatus and circuits shown above the dotted lines $x$ in the figures are located upon the vehicles, and the sheaths, contacts, &c., located beneath the said lines are supported and carried by the vehicles.

In the overhead plan (shown in Fig. 8) the supports $b\ b$ are sustained by brackets or cross-pieces $b'$ on poles $b''$, arranged alongside of the railway, and both the contacts $c$ and $c'$ and the sheath C between them are made yielding vertically by means of springs $p\ p$, interposed between the said parts and the top of the car A.

I do not limit myself to the details of construction, as they may be modified in various ways without departing from my invention.

Having described my invention, what I claim as new, and desire to secure by Letters Patent, is—

1. In an electric railway, a permanently-continuous line-working conductor, a vehicle, an electromotor to propel said vehicle, electrical connections between said motor and working-conductor, and suitable means to create electrical resistance or counter electro-motive force in said conductor between the connections.

2. In an electric railway, a permanently-continuous line-working conductor, a vehicle, an electric motor to propel said vehicle, electrical connections between said motor and working-conductor, a portion of the line-working conductor between the connections, and suitable means to create electrical resistance or counter electro-motive force in said conductor between the connections.

3. In an electric railway, a permanently-continuous line-working conductor, a vehicle, an electric motor to propel said vehicle, two electrical connections carried by the vehicle and making contact with the working-conductor to supply electricity to the motor, and means carried by the vehicle to create electrical resistance or counter electro-motive force in said conductor between the connections.

4. In an electric railway, a permanently-continuous line-working conductor, a vehicle, an electric motor to propel said vehicle, two electrical connections carried by the vehicle and making contact with the working-conductor to supply electricity to the motor, and means carried by the vehicle to create electrical resistance or counter electro-motive force in said conductor between the connections, and consisting of a sheath of paramagnetic material partially or entirely surrounding the line-working conductor.

5. In an electric railway, a permanently-continuous line-working conductor, a vehicle, an electric motor to propel said vehicle, two electrical connections carried by the vehicle and making contact with the working-conductor to supply electricity to the motor; and means carried by the vehicle to create electrical resistance or counter electro-motive force in said conductor between the connections, and consisting of a sheath of laminated iron partially or entirely surrounding the line-working conductor.

6. In an electric railway, a source of irregular or alternating currents, a permanently-continuous line-working conductor connected to the source, a vehicle, an electric motor to propel said vehicle, electrical connections carried by the vehicle and making contact with the line-conductor to supply electricity to the motor, and means carried by the vehicle to create electrical resistance or counter electro-motive force in said line-conductor between the connections.

7. In an electric railway, a slotted conduit, a permanently-continuous line-working conductor in said conduit, a vehicle, an electric motor to propel said vehicle, two electrical connections carried by the vehicle and making contact with the working-conductor to supply electricity to the motor, and means carried by the vehicle to create electrical resistance or counter electro-motive force in said conductor between the connections.

8. In an electric railway, a source of irregular or alternating currents, a permanently-continuous line-working conductor connected to the source, a vehicle, an alternating-current electric motor to propel said vehicle, electrical connections carried by the vehicle and making contact with the line-conductor to supply electricity to the motor, and means carried by the vehicle to create electrical resistance or counter electro-motive force in said line-conductor between the connections.

9. In a current-collector for a vehicle, the combination of two electrical connections carried by the vehicle and making contact with a line-conductor along the path of the vehicle and disposed one in advance of the other, and a suitable counter electro-motive force device carried by said vehicle and located between the electrical connections.

10. The combination, in an electric railway, of two tracks leading from the generating-station, a permanently-continuous line-working conductor extending from the generating-station along one of said tracks and returning to said station along the other track, a vehicle, an electric propelling-motor on the vehicle, electrical connections between the motor and line-conductor, and means to create resistance or counter electro-motive force in said line-conductor between said connections.

11. The combination, in an electric railway, of two parallel tracks leading from the generating-station, a permanently-continuous line-working conductor extending from the generating-station along one of said tracks and returning to said station along the other track, a vehicle, an electric propelling-motor on the vehicle, electrical connections between the motor and line-conductor, and means to create resistance or counter electro-motive force in said line-conductor between said connections.

12. The combination, in an electric railway, of two tracks leading from the generating-station, a slotted conduit for each track, a permanently-continuous line-working conductor extending from the generating-station along one of said tracks and returning to said station along the other track and in said conduit, a vehicle, an electric propelling-motor on the vehicle, electrical connections between the motor and line-conductor, and means to create resistance or counter electro-motive force in said line-conductor between said connections.

13. In an electric railway, a permanently-continuous line-working conductor, supports for said conductor, a vehicle, an electric motor to propel said vehicle, two electrical connections carried by the vehicle and making contact with the working-conductor to supply electricity to the motor, and means carried by the vehicle to create electrical resistance or counter electro-motive force in said conductor between the connections, and consisting of a sheath of paramagnetic material entirely surrounding the line-working conductor and a normally-closed longitudinal yielding passage through the sheath to permit said supports to pass through.

14. In an electric railway, a permanently-continuous line-working conductor, a vehicle, an electric motor to propel said vehicle, two electrical connections carried by the vehicle and making contact with the working-conductor to supply electricity to the motor, and means carried by the vehicle to create electrical resistance or counter electro-motive force in said conductor between the connections, and consisting of a sheath of paramagnetic material partially or entirely surrounding the line-working conductor and a coil of insulated wire wound upon said sheath.

15. In an electric railway, a permanently-continuous line-working conductor, a vehicle, an electric motor to propel said vehicle, two electrical connections carried by the vehicle and making contact with the working-conductor to supply electricity to the motor, and means carried by the vehicle to create electrical resistance or counter electro-motive force in said conductor between the connections, and consisting of a sheath of paramagnetic material partially or entirely surrounding the line-working conductor and a coil of insulated wire wound upon said sheath and connected with a source of electricity.

16. In an electric railway, a source of irregular or alternating currents, a permanently-continuous line-working conductor connected to the source, a vehicle, an electric motor to propel said vehicle, electrical connections carried by the vehicle and making contact with the line-conductor to supply electricity to the motor, and means carried by the vehicle to create electrical resistance or counter electro-motive force in said line-conductor between the connections, and consisting of a sheath of paramagnetic material partially or entirely surrounding the line-working conductor and a coil of insulated wire wound upon said sheath and connected with a source of irregular or alternating currents derived from or induced by the source connected to the line-conductor.

17. In an electric railway, a permanently-continuous line-working conductor, supports for said conductor, a vehicle, an electric motor to propel said vehicle, two electrical connections carried by the vehicle and making contact with the working-conductor to supply electricity to the motor, and means carried by the vehicle to create electrical resistance or counter electro-motive force in said conductor between the connections, and consisting of a sheath of paramagnetic material entirely surrounding the line-working conductor, a longitudinal slot through the sheath to permit said supports to pass through, and an iron brush or brushes fixed to or in the side or sides of the slot and extending transversely across the same to maintain the slot closed.

18. In an electric railway, a permanently-continuous line-working conductor, insulated supports of paramagnetic material for said conductor, a vehicle, an electric motor to propel said vehicle, two electrical connections carried by the vehicle and making contact with the working-conductor to supply electricity to the motor, and means carried by the vehicle to create electrical resistance or counter electro-motive force in said conductor between the connections, and consisting of a sheath of paramagnetic material entirely surrounding the line-working conductor, a longitudinal slot through the sheath to permit said supports to pass through, and an iron brush or brushes fixed to or in the side or sides of the slot and extending transversely across the same to maintain the slot closed.

19. In an electrical railway, a permanently-continuous line-working conductor, a vehicle, an electric motor to propel said vehicle, two electrical connections carried by the vehicle and making contact with the working-conductor to supply electricity to the motor, and means carried by the vehicle to create electrical resistance or counter electro-motive force in said conductor between the connections, a shunt-circuit around the motor on the vehicle, and means to regulate the current flowing through the shunt-circuit.

20. In an electric railway, a line-working conductor, a vehicle, an electric motor to propel said vehicle, electrical connections between said motor and working-conductor, and suitable means to create counter electro-motive force or a tendency thereto in the line-conductor between the connections.

In testimony whereof I have hereunto signed my name this 31st day of October, 1889.

MARK W. DEWEY. [L. S.]

Witnesses:
  E. LAASS,
  C. L. BENDIXON.